(12) United States Patent
Sadki et al.

(10) Patent No.: US 9,973,110 B2
(45) Date of Patent: May 15, 2018

(54) ELECTRICAL ARCHITECTURE FOR CONVERTING DC VOLTAGE INTO AC VOLTAGE, AND VICE VERSA

(71) Applicant: Valeo Systemes de Controle Moteur, Cergy Saint Christophe (FR)

(72) Inventors: Hicham Sadki, Cergy (FR); Nathalie Coia, Taverny (FR); Boris Bouchez, Cergy (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days. days.

(21) Appl. No.: 14/769,341

(22) PCT Filed: Feb. 18, 2014

(86) PCT No.: PCT/FR2014/050340
§ 371 (c)(1),
(2) Date: Aug. 20, 2015

(87) PCT Pub. No.: WO2014/128401
PCT Pub. Date: Aug. 28, 2014

(65) Prior Publication Data
US 2015/0381076 A1    Dec. 31, 2015

(30) Foreign Application Priority Data

Feb. 21, 2013   (FR) ...................................... 13 51497

(51) Int. Cl.
*H02M 7/5383*      (2007.01)
*H02M 7/5387*      (2007.01)
(Continued)

(52) U.S. Cl.
CPC ............... *H02M 7/797* (2013.01); *B60L 3/00* (2013.01); *B60L 11/1812* (2013.01);
(Continued)

(58) Field of Classification Search
CPC ........... H02M 7/53846; H02M 7/5387; H02M 5/4585; H02M 7/493; H02P 29/032; Y02T 90/127; B60L 3/00; B60L 11/1812
See application file for complete search history.

(56) References Cited

U.S. PATENT DOCUMENTS 5,309,079 A * 5/1994 Takada ................ H02P 23/0077
                                                            318/807
5,506,484 A * 4/1996 Munro ................. B60L 3/0069
                                                            318/139

(Continued)

FOREIGN PATENT DOCUMENTS

FR        2996383 A1      4/2014
WO    2010/057893 A1      5/2010

OTHER PUBLICATIONS

John W Bennett Et Al: "A Prototype electrical Actuator for Aircraft Flaps" IEEE service center May 1, 2010 vol. IA-19.*

(Continued)

*Primary Examiner* — Timothy J Dole
*Assistant Examiner* — Sisay G Tiku
(74) *Attorney, Agent, or Firm* — Osha Liang LLP (57) ABSTRACT

An electrical architecture (1) for converting DC voltage into AC voltage, and vice versa, comprising: —a DC/AC voltage converter (2), comprising a plurality of arms mounted in parallel, each arm comprising two controllable switching cells (12), in series and separated by a mid-point, the arms being paired in H-bridges (11), —for each H-bridge (11), a dedicated control member (13), such that all of the switching cells (12) of said H-bridge (11) can be controlled by this control member (13), each control member (13) being intended to communicate with a same remote control unit (14) through a potential barrier (15).

21 Claims, 5 Drawing Sheets

(51) Int. Cl.
*H02M 7/493* (2007.01)
*H02P 29/032* (2016.01)
*H02M 7/797* (2006.01)
*B60L 3/00* (2006.01)
*B60L 11/18* (2006.01)
*H02P 29/68* (2016.01)
*H02M 5/458* (2006.01)

(52) U.S. Cl.
CPC ......... *B60L 11/1816* (2013.01); *H02M 7/493* (2013.01); *H02P 29/032* (2016.02); *H02P 29/68* (2016.02); *B60L 2210/40* (2013.01); *H02M 5/4585* (2013.01); *Y02T 10/642* (2013.01); *Y02T 10/7005* (2013.01); *Y02T 10/7072* (2013.01); *Y02T 10/7241* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 5,629,603 | A * | 5/1997 | Kinoshita | B60L 11/1803 180/65.8 |
| 5,642,270 | A * | 6/1997 | Green | B60L 11/126 363/17 |
| 6,497,209 | B1 * | 12/2002 | Karuppana | F02N 11/08 123/179.3 |
| 7,259,530 | B2 * | 8/2007 | Ochiai | B60L 3/0046 318/105 |
| 7,847,499 | B2 * | 12/2010 | Nakamura | B60L 3/003 318/400.27 |
| 7,940,016 | B2 * | 5/2011 | Donnelly | B60L 7/04 318/139 |
| 8,337,352 | B2 * | 12/2012 | Morrow | B60K 6/365 475/302 |
| 9,327,605 | B2 * | 5/2016 | Januschevski | B60L 11/1811 |
| 2004/0178754 | A1 * | 9/2004 | Anwar | H02P 3/025 318/362 |
| 2012/0019173 | A1 | 1/2012 | de Sousa et al. | |
| 2014/0292243 | A1 * | 10/2014 | Bouchez | H02M 7/003 318/400.29 |
| 2016/0077566 | A1 * | 3/2016 | Caubert | B60L 11/803 713/340 |

OTHER PUBLICATIONS

Ertugrul N et al "Fault tolerant motor drive system with redundancy for crtical applications" Jun. 23, 2002, vol. 3 Annual power electronics specialists conference.*
Wenping Cao Et Al., "Overview of Electric Motor Technologies Used for More Electric Aircraft (MEA)" Sep. 9, 2012, vol. 59, No. 9, IEEE Transactions on Industrial Electronics.*
International Search Report issued in PCT/FR2014/050340 dated Jan. 7, 2015 (6 pages).
Klonne A et al., "Systematic approach of rapid prototyping for EC drives in automotive applications", Power Electronics Specialists Conference, IEEE 35th Annual (3), 2245-2250 (2004)(6 pages).
Bennett J W et al., "Fault-tolerant control architecture for an electrical actuator", Power Electronics Specialists Conference, IEEE 35th Annual (6), 4371-3477 (2004)(7 pages).

* cited by examiner

ELECTRICAL ARCHITECTURE FOR CONVERTING DC VOLTAGE INTO AC VOLTAGE, AND VICE VERSA

The present invention relates to an electrical architecture for converting a DC voltage into an AC voltage, and vice versa.

This architecture can be on board an electric or hybrid vehicle, and can be used to convert the power supply voltage supplied by an electrical network into a DC voltage supplying an electrical energy storage unit in order to charge the latter. As a variant, the architecture can be used to convert the DC voltage supplied by this electrical energy storage unit into an AC voltage supplying the stator of an electric machine being used to propel the vehicle or into an AC voltage transferred to the polyphase electrical network.

For such an application to a vehicle, it is necessary to ensure that one or more faults that can occur within any component involved in the electrical supply of the motor from the electrical energy storage unit when the vehicle is moving will not affect the safety of the users of the vehicle or of other persons.

Likewise, it is necessary to ensure that one or more faults that can occur within any component involved in the charging of the electrical energy storage unit from the electrical network will also not affect the safety of persons located near the vehicle.

Thus, there is a need to benefit from an architecture allowing the conversion of a DC voltage into an AC voltage, and vice versa, and which meets the abovementioned safety requirements, while being relatively simple and not very complex to implement.

According to one of its aspects, the invention responds to this need with the aid of an electrical architecture for converting a DC voltage into an AC voltage, and vice versa, comprising:
  a DC/AC voltage converter, comprising a plurality of arms assembled in parallel, each arm comprising two controllable switching cells, in series and separated by a midpoint, the arms being paired according to H-bridges,
  for each H-bridge, a dedicated control block, such that all the switching cells of said H-bridge can be controlled by this control block, each control block being intended to, notably configured to, communicate with a remote control unit through a potential barrier.

According to the above architecture, each H-bridge benefits from a control block dedicated to said bridge. The architecture is thus divided into several compartments which are relatively independent with respect to one another, each compartment comprising notably an H-bridge and the control block dedicated to it. Due to this relatively independent compartmentalization, a fault arisen within one compartment does not affect the operation of the other compartments, such that the operation of the architecture and/or the safety of persons located near it can be ensured.

In the case of an application of the invention to a hybrid or electric vehicle, each compartment can additionally comprise one phase of the electrical stator winding of the electric machine being used to propel the vehicle.

Hereafter, "low voltage" denotes voltages less than or equal to 12 V, and "high voltage" denotes voltages greater than or equal to 60 V.

The architecture can comprise the remote control unit. In this case, the remote control unit is in a low-voltage environment while the converter and control blocks of the H-bridges are in a high-voltage environment, these two environments being separated by the potential barrier.

For example, a failure on the control of one phase of the electrical stator winding of the electric machine, i.e. a failure on the H-bridge dedicated to said phase or on the control block of the switching cells of said bridge, does not prevent the continuation of the propulsion of the vehicle by this motor or the continuation of the charging of the electrical energy storage unit, when this charging operation reuses the electrical stator winding of the electric machine.

Each control block can comprise a first source of electrical energy and a second source of electrical energy, separate from the first source of electrical energy. By virtue of the availability of two separate energy sources for the electrical power supply, any fault affecting one of the energy sources does not prevent the operation of the control block which can then be supplied by the other electrical energy source. This can ensure a more reliable operation of the architecture.

One of the electrical energy sources is for example formed using one or more batteries while the other electrical energy source is obtained using a high or low voltage available in the architecture. For example, the second source of electrical energy comprises the electrical energy storage unit supplying the electric motor, and a DC/DC voltage converter providing for adapting the value of the voltage across the terminals of this electrical energy storage unit to a value compatible with the power supply for a control block. Notably, this is a reversible DC/DC voltage converter, for example as described in the application filed in France on 28 Sep. 2012 under the number 12 59180.

The first voltage source is for example a low-voltage source, such as the electrical energy source of the onboard network when the architecture is fitted on board a vehicle. If necessary, a DC/DC voltage converter can be used to lower the value of the voltage supplied by this low-voltage source. The low-voltage source supplies for example all the control blocks. When a DC/DC voltage converter is used to lower the value of the voltage supplied by this low-voltage source, there can be as many such converters as there are control blocks. The abovementioned first and second sources are for example common to all the control blocks.

Each control block can comprise at least one from among:
  a digital processing unit configured to communicate with the remote control unit,
  a device for measuring at least one electrical quantity in the H-bridge, notably a voltage or a current, and
  a device for measuring the temperature in the H-bridge.

The digital processing unit is for example configured to exploit measurements of temperature and/or electrical quantities in the H-bridge. If necessary, these measurements thus exploited are transmitted to the remote control unit, such that the latter can generate the setpoints which, once received and processed by each control block, will allow the latter to drive the switches of the H-bridge to which it is dedicated.

These measurements can provide for detecting the occurrence of one or more faults in each compartment of the architecture, and the setpoints generated on the basis of these measurements provide for meeting the abovementioned safety-related constraints. These setpoints are for example duty cycle values to be applied to the controllable switches of the switching cells.

Prior to the detection of one or more faults in the architecture, a first control mode can be applied to the switching cells and, due to the detection of the fault or faults, a second control mode can be generated and then can be applied to all or some of the switching cells in order to meet the abovementioned safety requirements.

The second control mode can be generic, the same setpoint being applied as soon as a fault is detected in the architecture, independently of the nature of this fault.

As a variant, the second control mode can be adapted to the detected fault, i.e. the applied setpoints can differ depending on the nature of the fault detected and/or depending on the number of faults.

Each control block of an H-bridge of the DC/AC voltage converter can communicate with the other control blocks of the other H-bridges of said converter.

The digital processing unit of each control block can be configured to communicate with a digital processing unit of the remote control unit via a link common to the control blocks and passing through said potential barrier.

One of the digital processing units of the control blocks is preferably master for this communication, the digital processing unit of the remote control unit and the other digital processing units of the other control blocks then being slaves. In the sense of the present application, a processing unit is master when it has the initiative of triggering the communication via the link.

If necessary, if the digital processing unit of a control block which is master suffers a fault, another of the processing units of the other control blocks becomes master in its place.

By virtue of the fact that the communication between the low-voltage environment in which the remote control unit is located and the high-voltage environment in which the DC/AC voltage converter is located is performed on the initiative of the control blocks of the H-bridges, in the event of a failure or fault at the remote control unit or at any other component in the low-voltage environment, the control blocks of the H-bridges can continue to operate and drive the switching cells of the DC/AC voltage converter by applying an operating mode that does not require interaction with the remote control unit.

The abovementioned compartmentalization of the architecture additionally provides for overcoming to a certain extent faults occurring on components of the high-voltage environment. The control of each H-bridge can be independent of the control of the other H-bridges of the architecture.

The link allowing communication between the remote control unit and the control blocks of the DC/AC voltage converter can be a full-duplex synchronous serial link. It can be a Serial Peripheral Interface (SPI) type link. The link can pass through the potential barrier.

If necessary, a single potential barrier can be placed between the remote control unit and the control blocks of the H-bridges of the converter.

Each switching cell can be produced using a bidirectional current switch, for example a field effect transistor or an IGBT type transistor with a diode fitted in antiparallel.

According to a first example implementation of the invention, the architecture lacks a DC/DC voltage converter placed between the electrical energy storage unit and the DC/AC voltage converter, such that the DC interface of this DC/AC voltage converter can be connected to the terminals of the electrical energy storage unit.

The digital processing units of the control blocks can be programmable logic circuits (FPGAs) and the digital processing unit of the remote control unit can be a microcontroller.

When the digital processing units of the control blocks are programmable logic circuits (FPGAs) and when the remote control unit uses a microcontroller, the architecture then uses three FPGAs and one microcontroller to perform the entire control of the switching cells of the converter.

As a variant, according to a second example implementation of the invention, the architecture can comprise a DC/DC voltage converter comprising a high-voltage interface and a low-voltage interface, one from the high-voltage interface and the low-voltage interface being connected to the DC/AC voltage converter.

According to this second example implementation of the invention, the DC/DC voltage converter can comprise several interleaved branches, each branch comprising:

an arm extending between two terminals defining the low-voltage interface, said arm comprising two controllable switching cells, in series and separated by a midpoint, a coil having one end connected to the midpoint of the branch and the other end connected to the positive terminal of the high-voltage interface.

This implementation of the DC/DC voltage converter using several interleaved branches can provide for better distributing the power between the various branches, and thus provide for prolonging the lifetime of the switching cells of this converter.

The switching cells of the DC/DC voltage converter may or may not be obtained using bidirectional current switches. These switching cells are for example identical to those of the DC/AC voltage converter.

The DC/DC voltage converter can comprise an even number of branches, and the branches can be paired, the coil of a branch of a pair being in magnetic coupling with the coil of the other branch of said pair.

According to a first sub-mode of this second example implementation of the invention, the architecture can comprise, for each pair of branches, a control block suitable for driving all the switching cells of said pair of branches.

According to this sub-mode, the DC/DC voltage converter and its control are compartmentalized and there is a certain degree of independence from one compartment to the other. Each compartment comprises a pair of branches and the associated control block. Thus, any fault in one compartment does not affect the other compartments.

Still according to this sub-mode, each control block of a pair of branches of the DC/DC voltage converter can comprise a first source of electrical energy and a second source of electrical energy that is separate from the first source of electrical energy. As mentioned previously in relation to the electrical energy supply of the control block dedicated to an H-bridge, this dual electrical power supply available provides for reducing the risks of an electrical power supply fault of the control block.

Still according to this sub-mode, each control block of a pair of branches of the DC/DC voltage converter can comprise at least one from among:

a digital processing unit configured to communicate with the remote control unit, a device for measuring at least one electrical quantity in the pair of branches, and a device for measuring the temperature in the pair of branches.

The dual electrical power supply available can thus provide for ensuring that these measurements and processing operations will be carried out if needed.

The abovementioned measurements can provide for detecting the occurrence of one or more faults at the pair of branches while a first mode of control of the switching cells of the DC/DC voltage converter is applied. When this fault is detected, a second control mode can be generated and then applied to all or some of the switching cells of said converter, similarly to that which has already been described in relation to the DC/AC voltage converter.

If necessary, the second control mode and the first control mode are applied simultaneously:
- to all or some of the switching cells of the DC/AC voltage converter, and
- to all or some of the switching cells of the DC/DC voltage converter.

Each control block of a pair of branches can comprise a digital processing unit configured to communicate with the digital processing unit of the remote control unit and this communication can take place via the abovementioned link which is then common:
- to the control blocks of the switching cells of the H-bridges of the DC/AC voltage converter, and
- to the control blocks of the switching cells of the pairs of branches of the DC/DC voltage converter, said link passing through said potential barrier.

At least one of the digital processing units of a control block is preferably master for this communication.

As already explained above, when a digital processing unit assigned to driving the switching cells of the high-voltage environment operates as a master, the consequences on the converters of one or more faults occurring in the low-voltage environment are reduced.

The digital processing units of the control blocks can be programmable logic circuits (FPGAs) and the digital processing unit of the remote control unit can be a microcontroller.

When these digital processing units of the control blocks are FPGAs and when the remote control unit uses a microcontroller, the architecture then uses six FPGAs and one microcontroller to perform the entire control of the switching cells of the converters.

Still according to this sub-mode, the number of branches of the DC/DC voltage converter can be equal to the number of arms of the DC/AC voltage converter and the architecture then comprises as many control blocks driving the switching cells of the DC/AC voltage converter as control blocks driving the switching cells of the DC/DC voltage converter.

According to a second sub-mode of the second example implementation of the invention, the number of branches of the DC/DC voltage converter is equal to the number of arms of the DC/AC voltage converter, and each control block dedicated to an H-bridge also drives all the switching cells of a pair of branches of the DC/DC voltage converter.

According to this second sub-mode, the control blocks simultaneously play the role of control blocks of the architecture lacking a DC/DC voltage converter according to the first example implementation of the invention and the role of control blocks of switching cells of pairs of branches of the architecture according to the first sub-mode of the second example implementation of the invention which has just been described.

The digital processing units of the control blocks can be programmable logic circuits (FPGAs) and the digital processing unit of the remote control unit can be a microcontroller.

When each control block comprises a processing unit being an FPGA and when the remote control unit uses a microcontroller, the architecture uses three FPGAs and one microcontroller to perform the entire control of the switching cells of the converters, i.e. as many processing components as there are in the absence of a DC/DC voltage converter, although the latter is present. According to this second sub-mode, the architecture is more efficient with reduced size and cost.

According to one or the other of these sub-modes, the DC/AC voltage converter can comprise six arms and the DC/DC voltage converter can comprise six branches.

According to another example implementation of the invention, the architecture lacks a DC/AC voltage converter, the DC/DC voltage converter being placed between a connector suitable for being connected to an electrical network and the electrical energy storage unit, and each pair of branches of the DC/DC voltage converter is associated with a control block dedicated to this pair and providing for driving all the switching cells of this pair.

In all that precedes, the architecture can comprise only one microcontroller, the latter forming part of the remote control unit, and several FPGAs, notably three or six, the latter forming digital processing units of the control blocks of the H-bridges.

In all that precedes, a sensor for the position of the rotor of the electric machine and/or a sensor for the temperature in the electric motor, for example the temperature of the stator, can be arranged in the low-voltage environment and interact directly with the remote control unit, without the intermediary of components of the high-voltage environment. A single position sensor can thus interact with the remote control unit, the latter notably using a microcontroller, as mentioned above.

Another subject of the invention, according to another of its aspects, is an architecture as defined above, additionally comprising:
- an electrical energy storage unit having a DC voltage across its terminals, and connected directly or not to the DC/AC voltage converter, and
- a polyphase electrical stator winding, each electrical phase of the stator being connected between two midpoints of an H-bridge.

The architecture can comprise a power supply line suitable for being connected via a connector to the external electrical network, the power supply line comprising a number of conductors equal to the number of phases of the electrical stator winding and each conductor having one end connected to an intermediate point of a phase of the electrical stator winding. The intermediate point of said phase can be a midpoint.

The electrical network can be an industrial electrical network managed by an operator. For example, it is an electrical network supplying a voltage at a frequency of 50 Hz or 60 Hz.

It can be a single phase network supplying a voltage of between 120 V and 240 V or a polyphase network, for example three-phase, notably a three-phase network supplying a voltage of between 208 V and 416 V.

Another subject of the invention, according to another of its aspects, is a control method for the abovementioned architecture, in which:
- it is detected that at least one fault occurs in the architecture while a first control mode is applied to the switching cells, and
- a second control mode is generated when this fault is detected, this second control mode being then applied to all or some of the switching cells.

When the first control mode allows the power supply from the electrical energy storage unit for the electrical stator winding and when the latter is polyphase, the second control mode can provide for placing all or some of the electrical phases of said winding in short circuit, notably in the event of a fault in the low-voltage environment or in the event of a fault on the link allowing communication with the remote control unit. When the fault relates only to the control of one phase of the electrical stator winding, i.e. to the H-bridge dedicated to said phase or on the control block of the switching cells of said bridge, the second control mode can provide for placing the other electrical phases of the electrical stator winding in short circuit or provide for temporarily suppressing the electrical phase in question. This temporary suppression of an electric phase notably involves stopping the supply to the control block associated with said phase and/or the switching cells of the H-bridge dedicated to said phase. When the first control mode allows the charging of the electrical energy storage unit from the electrical network through, among other items, the electrical stator winding, the second control mode can provide for interrupting the charging or can allow the charging to be carried out at a reduced performance level.

The charging is notably interrupted by opening one or more relays placed between the electrical network and the DC/AC voltage converter.

Notably, a charging operation is carried out at a reduced performance level by imposing, according to the second control mode, a setpoint value for the current in the electrical energy storage unit which is less than the setpoint value for said current according to the first control mode.

The invention will be able to be better understood upon reading the following description of non-limiting example implementations of the invention and upon examining the appended drawings in which.

Figure 1:
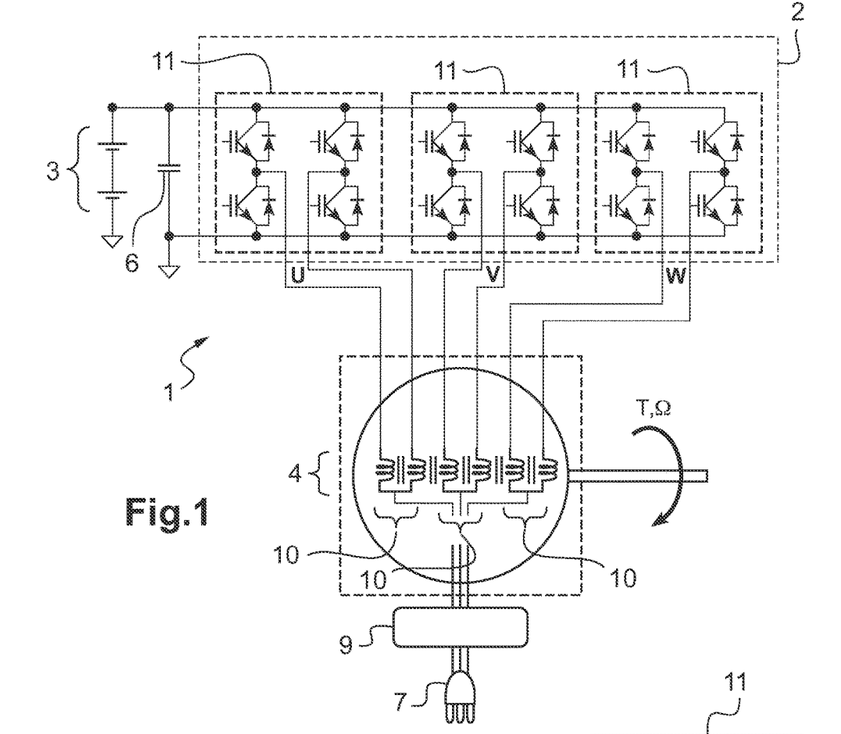
FIG. 1 partially represents an electrical architecture according to a first example implementation of the invention, FIG. 2 functionally represents the architecture according to the first example implementation of the invention, FIG. 3 functionally represents the digital processing unit of a control block dedicated to an H-bridge of the DC/AC voltage converter of the architecture of FIG. 1, FIGS. 4 and 5 are representations in block-diagram form of scenarios that arise when a fault occurs in the architecture according to this first example implementation of the invention, FIG. 6 partially represents an electrical architecture according to a first sub-mode of a second example implementation of the invention, FIG. 7 functionally represents the digital processing unit of a control block dedicated to a pair of branches of the DC/DC voltage converter of the architecture of FIG. 6, FIG. 8 partially represents an electrical architecture according to a second sub-mode of the second example implementation of the invention.

There is represented in FIG. 1 an electrical architecture 1 according to an example implementation of the invention. The electrical architecture 1 comprises:

a DC/AC voltage converter 2, an electrical energy storage unit 3, and an electrical stator winding 4 of an electric machine.

The DC/AC voltage converter 2 is in this example arranged between the electrical energy storage unit 3 and the electrical winding 4 so as to provide an exchange of electrical energy between these latter.

The electric machine is in this example being considered used to drive a hybrid or electric vehicle. This involves for example a permanent magnet synchronous motor. The electric machine exhibits for example a nominal power rating of between 10 W and 10 MW, notably between 100 W and 200 kW. In this example, the electrical stator winding 4 is three-phase.

The electrical energy storage unit 3 can be a battery, a supercapacitor or any assembly of batteries or supercapacitors. For example, several parallel branches of series-connected batteries are involved. The electrical energy storage unit 3 can have a nominal voltage rating of between 60 V and 800 V, notably between 200 V and 450 V or between 600 V and 800 V.

A capacitor 6 can be fitted in parallel with the electrical energy storage unit 3.

As represented in FIG. 1, the architecture 1 can comprise a connector 7 suitable for being connected to an industrial electrical network delivering a voltage at 50 Hz or 60 Hz.

This connector 7 is for example connected, via a filter 9 configured to eliminate electromagnetic interference, to an intermediate point of each phase 10 of the electrical stator winding 4. This is for example a mid-point for the phases, as taught in the application WO 2010/057893.

The converter 2 converts in this example the DC voltage across the terminals of the electrical energy storage unit 3 into a three-phase AC voltage supplying the electrical stator winding 4, in order to allow the propulsion of the vehicle.

Conversely, the converter 2 can convert the AC voltage supplied by the network and passing through the electrical stator winding 4 into a DC voltage supplying the electrical energy storage unit 3, in order to provide the charging of the latter. The connector 7 is then connected to a terminal of the electrical network.

The converter 2 here comprises three H-bridges 11, each H-bridge being formed by two arms fitted in parallel between the terminals of the electrical energy storage unit 3. Each arm exhibits in this example two reversible switching cells 12, fitted in series. A switching cell 12 is for example formed by the fitting in antiparallel of a transistor and a diode, the latter being if necessary the intrinsic diode of the transistor. The transistor can be field effect, IGBT or bipolar.

Each H-bridge 11 is associated with a control block 13 driving the operation of all the switching cells 12 of the bridge 11. For the case in which each switching cell 12 comprises a transistor, this control block 13 injects the gate or base current providing for changing the state of the transistor.

Figure 2:
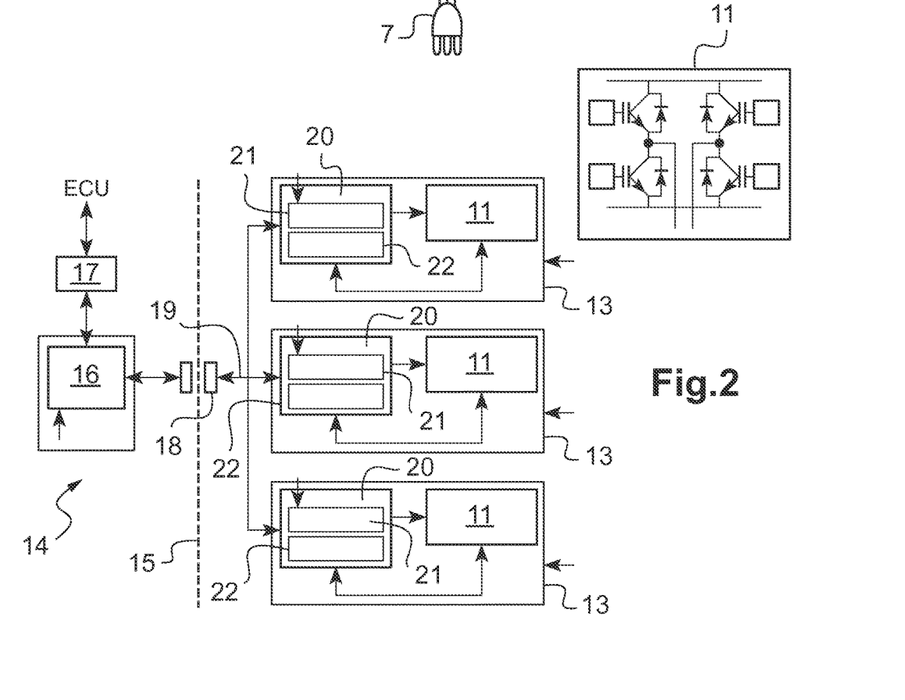

The architecture 1 comprises, as represented in FIG. 2, a remote control unit 14 exchanging data with each control block 13 via a link 19 which can be a full-duplex synchronous serial link, for example SPI. This exchange of data can take place, in the example of FIGS. 1 and 2, through a single potential barrier 15 through which the link 19 passes. This potential barrier 15 provides for example galvanic isolation, notably using a transformer or an opto-coupler. This barrier 15 separates the low-voltage environment to which the remote control unit 14 belongs from the high-voltage environment to which the control blocks 13, the DC/AC voltage converter 2, the electrical energy storage unit 3 and the electrical stator winding 4 belong.

The remote control unit 14 can comprise one or more processing systems, for example one or more microcontrollers 16. The remote control unit 14 can communicate with a supervisor via a CAN link 17. In an application to a vehicle, the supervisor can be the engine electronic control unit (ECU) of the vehicle. The control unit 14 can be responsible for generating setpoint values for the current in each arm of the bridge 11 and for the voltage across the terminals of the arms of the bridge 11.

In the context of communications via the link 19, one of the control blocks 13 can be master, as will be seen later, i.e. communication via this link 19 is managed by this control block 13. If necessary, the remote control unit 14 is associated with measurement units providing for measuring the temperature in the stator of the electric machine and with measurement units providing for determining the position of the rotor of the electric machine.

Each control block 13 will now be described in greater detail with reference to FIG. 2. Each control block 13 is in this case identical from one H-bridge to the other.

Each control block 13 comprises a digital processing unit 20 arranged to receive information on the state of the associated H-bridge 11, and to generate control signals to drive the switching cells 12 of the bridge 11, if necessary based on setpoints received from the remote control unit 14.

The processing unit 20 can be a programmable logic circuit (or FPGA). In this case, and when the processing by the remote control unit 14 uses a microcontroller, communication via the link 19 takes place between the FPGA 20 and the microcontroller 16. The FPGA 20 can be master and the microcontroller can be slave.

As represented in FIG. 2, the control signals to drive the switching cells 12 of the bridge 11 can be generated by a functional block 21 of the processing unit 20, this functional block 21 cooperating with another block 22 responsible for various strategies to be applied in the event of one or more faults in the bridge 11.

The control block 13 also comprises in the example being considered means for establishing a diagnostic of the state of the bridge 11. These means provide for example for measuring the voltage across the terminals of an arm of the bridge 11, the current in an arm of the bridge 11, for example by virtue of a shunt, or the temperature at a point located between the two arms of the bridge 11.

The values measured by these means are then transmitted to the processing unit 20. If necessary, these values can be analyzed autonomously by the processing unit 20, which can generate the control signals to drive the switching cells 12 of the bridge 11. As a variant, these values are sent to the remote control unit 14 via the link 19 in such a way that the latter generates the setpoints which will then be used by the processing unit 20 in order to generate the control signals driving the switching cells 12.

Figure 10:
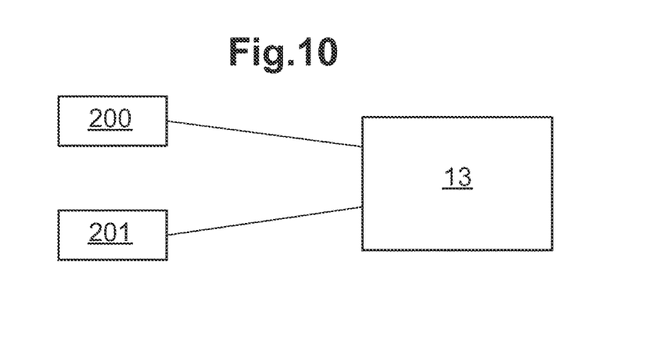

The control block 13 comprises in the example being considered a dual electrical energy supply, as can be seen in FIG. 10. This dual supply is formed by a first source 200 and a second source 201.

The first source 200 is for example the electrical energy source of the onboard network, the latter thus delivering a low voltage, for example in the order of 12 V. Each first source 200 of a control block 13 can come from one source common to the control blocks, this common source being notably as mentioned above the electrical energy source of the onboard network of the vehicle.

If necessary, a DC/DC voltage converter can be placed between the electrical energy source of the onboard network and each control block 13 in order to provide for lowering the value of the voltage supplied by the electrical energy source of the onboard network. It is for example preferable to electrically supply each control block 13 using a voltage having a value of less than 12 V, for example 6 V or less.

This first electrical energy source 200 can provide for supplying the various components of the control block 13, and the source 200 can be provided with means for activating the source 200, maintaining it in service and interrupting it when it is no longer necessary for it to operate or for safety reasons.

The second source 201 uses in this example an already-available high-voltage source, forming part of the architecture 1 or being accessible therefrom.

In this example being considered, the second source 201 uses the voltage supplied by the electrical energy storage unit 3. A DC/DC voltage converter, for example the one described in the application filed in France on 28 Sep. 2012 under number 12 59180 can provide for converting the voltage across the terminals of the electrical energy storage unit 3 to a low voltage compatible with the power supplying of the control block 13.

Figure 3:
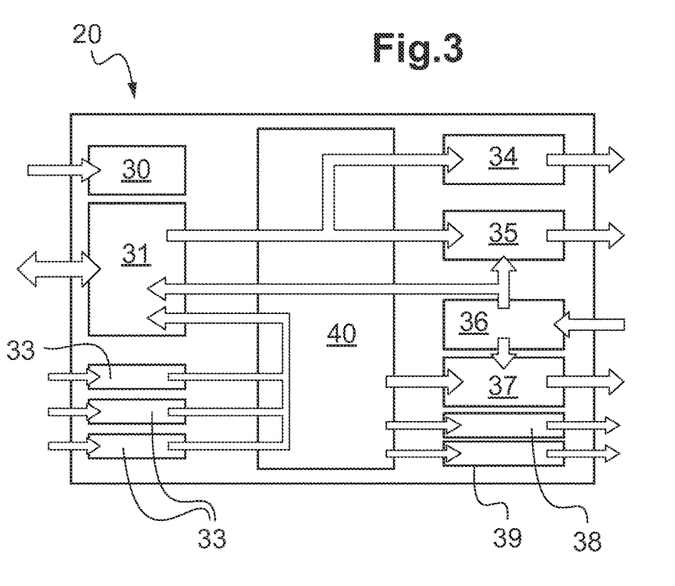

The processing unit 20 of FIG. 2 is represented functionally in FIG. 3. This unit 20 comprises:
- a module 30 forming a phase-lock loop, receiving a clock signal from the microcontroller 16, the clock frequency being for example 10 MHz,
- a half-duplex module 31 responsible for sending and receiving data via the link 19,
- a plurality of analog/digital converters 33 connected to the abovementioned measurement means. These converters 33 provide for acquiring analog values measured by these means and their analog/digital conversion;
- a module 34 generating duty cycle values for the voltage supplying the drivers of the switching cells;
- a module 35 generating duty cycle values which will be applied to the switching cells 12 of the bridge 11 in order to drive these switching cells, so as to control the operation of the DC/AC voltage converter 2 when the architecture 1 is used to propel the vehicle,
- a module 36 receiving as inputs the digital measurements supplied by the measurement means described previously, so as to perform a diagnostic of the state of the H-bridge 11,
- a module 37 generating duty cycle values which will be applied to the switching cells 12 of the bridge 11 in order to drive these switching cells, so as to control the operation of the DC/AC voltage converter 2 when the architecture 1 is used to charge the electrical energy storage unit 3,
- optionally, a digital/analog converter 38 exhibiting an output on four channels,
- optionally, a visual module 39, showing the activity of the processing unit 20, and
- a storage and computation module 40.

The interaction between the various modules above will now be described. The information received by the analog/digital converters 33 is sent by the module 31 to the remote control unit 14 after having passed through the module 40. The remote control unit 14 generates, based on at least this information, setpoints transmitted via the link 19 to the module 31 and then transmitted to the modules 34 and 35 after having passed through the module 40.

The information coming from the module 36 responsible for establishing a diagnostic on the state of the bridge 11 is transmitted to the modules 35 and 37 as well as to the remote control unit 14 via the modules 40 and 31. If necessary, this information is taken into account by the remote control unit 14 in order to generate the setpoints which are then transmitted to the modules 34 and 35, as explained above.

There will now be described with reference to FIGS. 4 and 5 examples of a second mode of control of the DC/AC voltage converter 2 by the various control blocks 13 when a fault is detected in the architecture while a first mode of control was applied.

Figure 4:
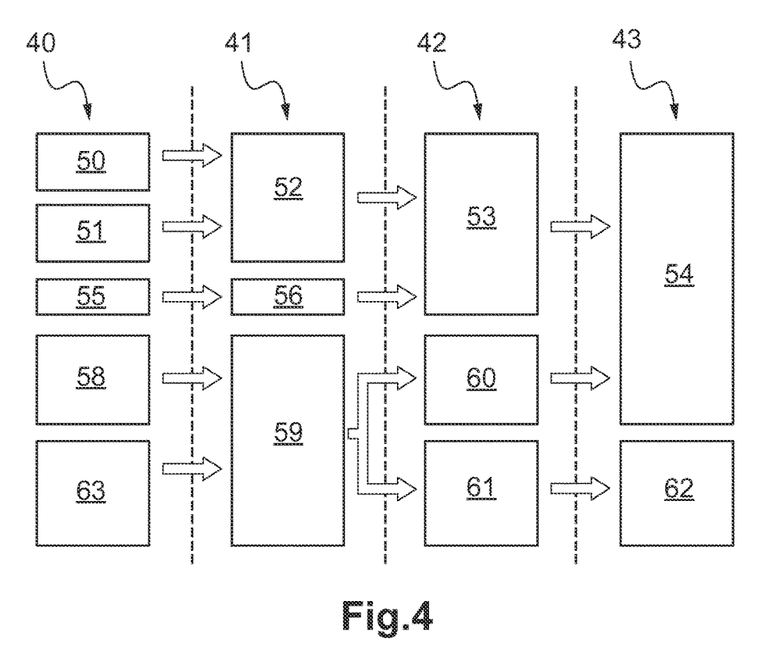

FIG. 4 corresponds to the case in which a fault is detected in the architecture 1 while the converter 2 operates as an inverter to supply the electrical stator winding 4 from the electrical energy storage unit 3, so as to propel the vehicle.

The column 40 corresponds to the faults that can occur in the architecture in the case being considered, while the column 41 indicates how this fault is detected, the column 42 indicates the configuration taken by the converter 2 due to the application of the second control mode by the switching cells 12, and the column 43 indicates the state of the propulsion of the vehicle due to the application of this second control mode.

The blocks 50 and 51 correspond respectively to:
- a loss of control of a component in the low-voltage environment, for example the remote control unit 14, and
- a fault on a passive power component, for example the capacitor 6.

These faults are detected according to 52 by the microcontroller 16 of the remote control unit 14 and/or by the FPGA 20. As a safety precaution, a second control mode is generated and then applied to the switching cells 12 and this second control mode is such that the converter 2 takes a configuration according to 53 in which the three phases of the electrical stator winding 4 are in short circuit.

Consequently, the motor torque becomes zero, such that the vehicle is no longer propelled by the electric motor and decelerates slowly according to 54. The block 55 corresponds to the case of a fault occurring at the link 19. This fault is detected according to 56 by the FPGA 20. The second control mode is generated by the control blocks 13 and applied to the switching cells 12, so as to then cause the converter 2 to shift into the same configuration as according to 53, such that the state corresponding to the block 54 is arrived at.

The block 58 corresponds to a loss of control of a component of the high-voltage environment, for example at the drivers of the switching cells 12 of a bridge 11. This fault is detected according to 59 by the remote control unit 14 and/or by the FPGA 20. The second control mode is then generated by the remote control unit 14 and/or by the FPGA 20, and then applied to the switching cells 12. This second control mode is such that, when it is applied, the converter 2 takes a configuration according to 60 in which two phases of the electrical stator winding 4 are in short circuit.

Consequently, the motor torque becomes zero, such that the vehicle is no longer propelled by the electric motor and decelerates slowly, still according to 54.

As a variant, when the remote control unit 14 or the FPGA 20 detects a fault according to 59, the second control mode generated can be such that, when it is applied to the switching cells 12, the converter 2 takes a configuration 61 in which a bridge 11 is in short circuit, such that only two phases of the electrical stator winding 4 are still used. Only two H-bridges 11 are then active. Consequently, the performance level of the electric motor is reduced, i.e. the maximum power that the motor can supply is reduced, the latter ending up in the state according to 62.

The block 63 corresponds to a fault occurring on an active power component of an H-bridge. This fault is detected according to 59 by the remote control unit 14 and/or by the FPGA 20, such that the converter can then end up in the configuration according to 60 or 61.

In summary, the DC/AC voltage converter 2 can take the configuration according to 53 when at least one of the following faults is detected:
- loss or degradation of communication with the supervisor, the CAN link, i.e. a fault in the low-voltage environment,
- loss or degradation of the SPI link 19 or in one of the modules 31 of the FPGAs 20,
- loss or degradation of the microcontroller 16 of the remote control unit 14,
- loss or degradation of the power supply of this microcontroller 16,
- degradation of the power supply of a sensor for the position of the rotor of the electric machine, this sensor interacting with the remote control unit 14, or loss or degradation of the position measurement supplied by this sensor,
- loss or degradation of an emergency stop program for the electric motor,
- major fault at the electric motor,
- loss of the EMC filter 9, or of an EMC filter arranged between the HV battery and the inverter,
- loss of the capacitor 6,
- loss or degradation of the power supply of the processing units 20 of the control blocks 13,
- loss or degradation of a signal ensuring the correct disconnection of a power connector placed between the electrical energy storage unit 3 and the DC/AC voltage converter 2.

The configurations 60 or 61 can be arrived at when one or more faults occur within a single compartment of the architecture 1, i.e. in the example being considered within a single control block 13 or within a single H-bridge 11.

This fault is one of at least:
- a loss or an error in the current measuring chain in the bridge 11 and/or in the voltage measuring chain in the bridge 11,
- a loss of connection of the bridge 11 at the electrical stator winding 4,
- a loss or a degradation of the processing unit 20 of the control block 13,
- a loss or a degradation of the drivers associated with each switching cell 12 and transmitting to the latter the setpoints from the processing unit 20,
- loss or degradation of the power supply of the processing units 20 of the control blocks 13.

Figure 5:
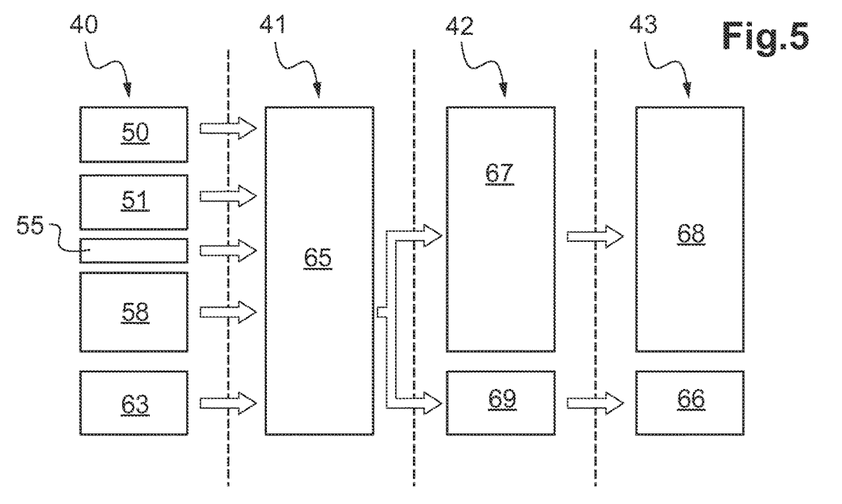

FIG. 5 corresponds to the case in which a fault is detected in the architecture 1 while the converter 2 operates as a rectifier to charge the electrical energy storage unit 3 from the electrical network through the electrical stator winding 4 and while a first control mode is applied to the switching cells 12.

The same faults according to blocks 50, 51, 55, 58 and 63 can occur and be detected by the remote control unit 14 or by the FPGA 20 according to a block 65.

Two second alternative control modes can then be generated and applied by the switching cells 12 of the bridges 11 of the converter 2 in this case.

One of these second control modes causes the converter 2 to shift into a configuration according to 67 in which the control of the switching cells 12 is interrupted due to the stopping of the electrical supply of the control blocks 13, and this configuration corresponds to a state 68 of the architecture 1 in which there is no charging of the electrical energy storage unit by the electrical network.

The other second control mode causes the converter 2 to shift into a configuration according to 69 in which a degraded charging occurs. This degraded charging corresponds for example to a charging with a reduced setpoint value for the current in the electrical energy storage unit 3.

The architecture 1 is then in a state 66 in which charging of the electrical energy storage unit 3 is carried out at a reduced performance level, the charging time being notably higher.

Analysis or a diagnostic of the state of the bridge 11 and determination of the strategy to be applied according to whether faults are detected in this bridge 11 can thus be carried out by the processing unit 20 of the bridge in question, if necessary using information transmitted by the link 19 from the remote control unit 14.

In the example which has just been described, the architecture 1 lacks a DC/DC voltage converter placed between the converter 2 and the electrical energy storage unit 3, such that the voltage on the DC interface of the converter 2 is substantially equal to that across the terminals of the electrical energy storage unit 3. The invention is however not restricted thereto, as will now be seen.

Figure 6:
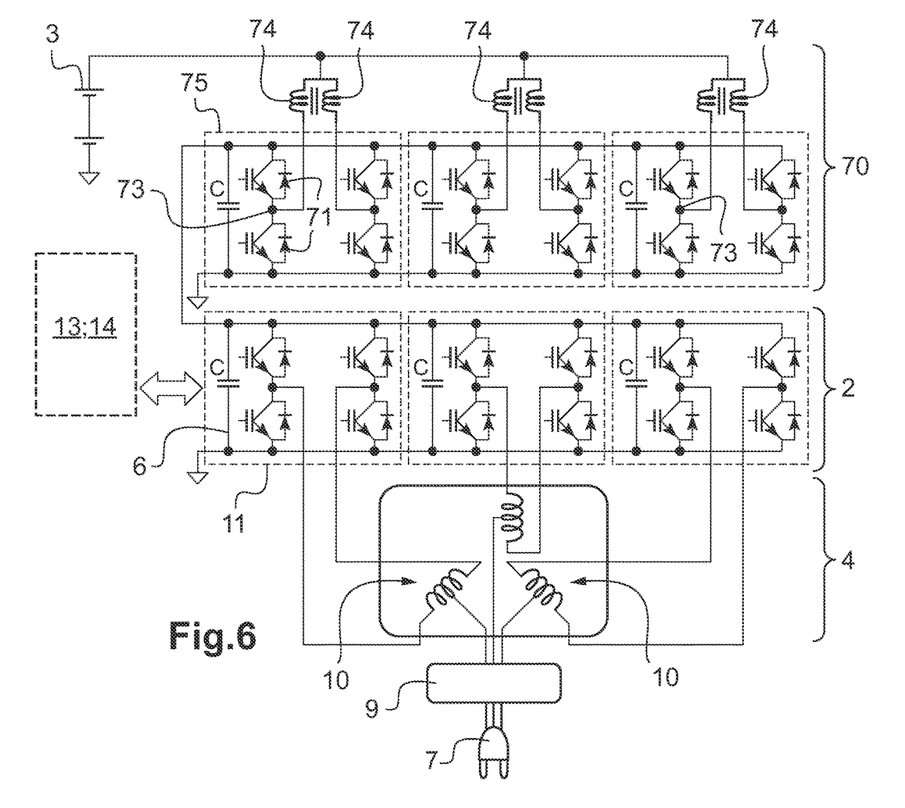

FIG. 6 represents an architecture 1 according to a second example implementation of the invention. This architecture 1 differs from that which has just been described with reference to FIGS. 1 to 5 due to the fact that it additionally comprises a DC/DC voltage converter 70 placed between the capacitor 6 and the electrical energy storage unit 3, i.e. the converter 70 is also arranged between said unit 3 and the DC/AC voltage converter 2.

The DC/DC voltage converter 70 provides for adapting the value of the voltage across the terminals of the electrical energy storage unit 3 to the value of the voltage suitable for supplying the electrical stator winding 4, and vice versa. This converter 70 is in this case interleaved, comprising several branches. Each branch comprises in this example:
  an arm fitted in parallel with the capacitor 6 and comprising two switching cells 71 in series, which are controllable and separated by a midpoint 73,
  a coil 74 with one end connected to the midpoint 73 of the arm and the other end connected to the high-voltage positive terminal of the electrical energy storage unit 3.

In the example being considered, the number of branches of the converter 70 is equal to the number of arms of the converter 2, i.e. six, and the branches are paired, the coil 74 of one branch of one pair 75 being in magnetic coupling with the coil 74 of the other branch of said pair 75.

In this example, each pair 75 of branches is associated with a control block not represented in this figure and responsible for driving all the switching cells 71 of this pair 75. Each control block is dedicated to one pair 75 of branches and it can be in every respect or not identical to a control block 13 of a bridge 11 of the converter 2 described previously. Each control block dedicated to a pair 75 of branches notably comprises a digital processing unit 77, similar or identical to the digital processing unit 20 described previously.

Figure 7:
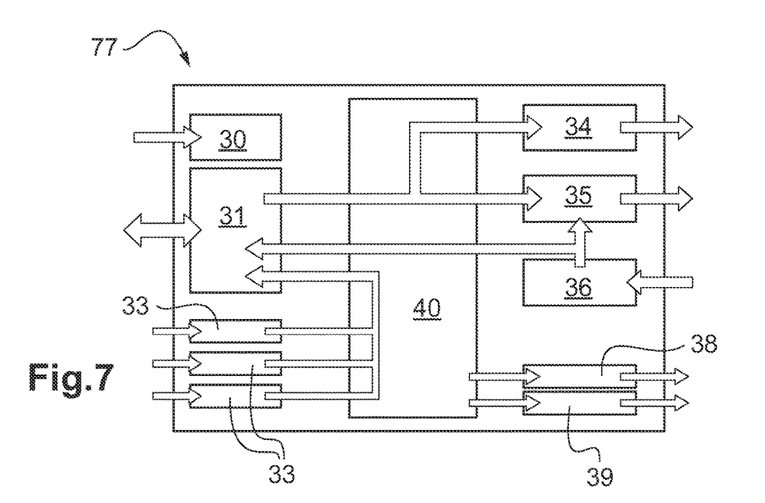

This processing unit 77 is for example implemented using an FPGA and it can differ from that described with reference to FIG. 3 only by the absence of the module 37. Each processing unit 77 then communicates with the remote control unit 14 via the link 19, the latter being shared with the processing units 20 of the control blocks 13. The link 19 comprises for example several wires and one is assigned to the exchange of data between the processing units 20 and the remote control unit 14 while another wire is assigned to the exchange of data between the processing units 77 and the remote control unit 14.

Similarly to that described earlier, when each processing unit 20 and each processing unit 77 are implemented using FPGAs and when the processing by the remote control unit 14 uses a microcontroller, communication via the link 19 takes place between the FPGAs and the microcontroller 16, and one of the FPGAs is master.

In the example of FIG. 6, the architecture 1 comprises six control blocks, namely:
  three control blocks 13, each being dedicated to an H-bridge 11 of the DC/AC voltage converter 2, and
  three control blocks, each being dedicated to a pair 75 of branches of the DC/DC voltage converter 70.

Thus, in this architecture there are three processing units 20 and three processing units 77, i.e. six FPGAs, when each processing unit 20 or 77 is implemented using an FPGA.

The presence of a control block dedicated to each pair 75 of branches of the converter 70 can provide for remedying the following faults occurring within said pair 75 or within the control block of said pair 75:
  a loss or an error in the current measuring chain in the pair 75 or in the voltage measuring chain in the pair 75,
  a loss or a degradation of the processing unit 77 of the control block of the pair 75,
  a loss or a degradation of the drivers associated with each switching cell 71 and transmitting to the latter the setpoints from the processing unit 77,
  loss of the auxiliary energy source of the control block of said pair 75 when the latter uses the electrical energy storage unit 3.

There will now be described with reference to FIGS. 8 and 9 an architecture 1 which differs from that which has just been described only by the fact that instead of having:
  a control block 13 dedicated to each H-bridge 11 of the DC/AC voltage converter 2, and
  a control block dedicated to each pair 75 of branches of the DC/DC voltage converter 70,
i.e. six control blocks in total, the architecture 1 comprises only three.

Figure 8:
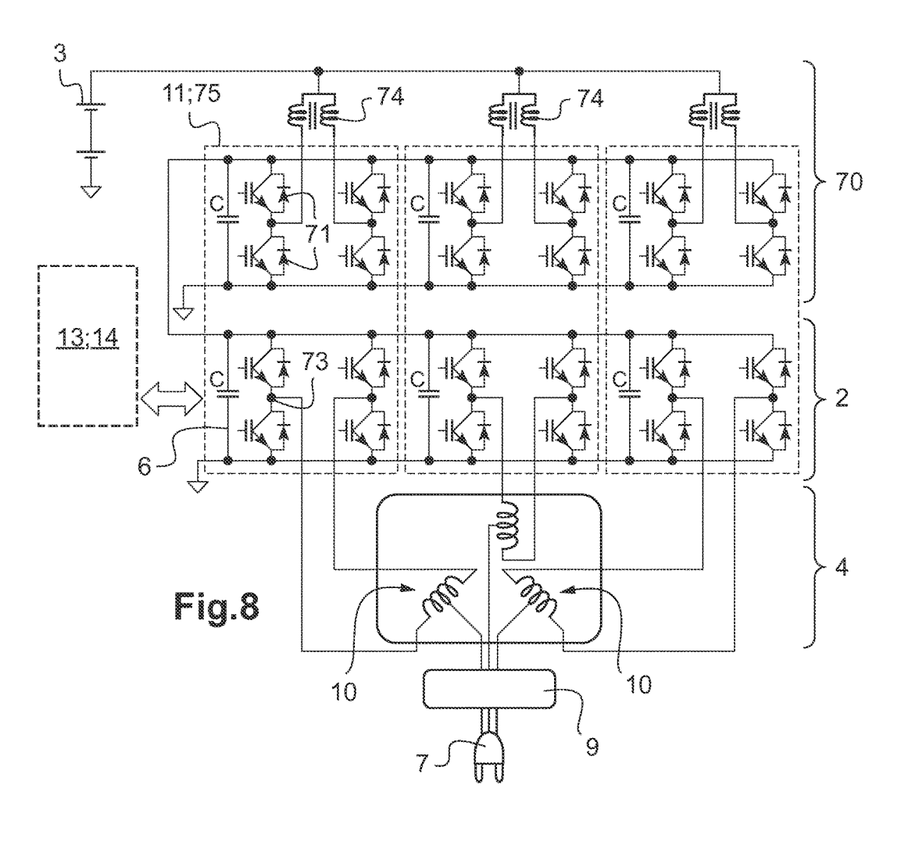

As represented in FIG. 8, according to this example implementation, a control block 13, in addition to driving the switching cells 12 of an H-bridge 11 of the DC/AC voltage converter 2, also drives the switching cells 71 of a pair 75 of branches of the DC/DC voltage converter 70. The processing units 20 described with reference to FIGS. 1 to 5 hence also play the role of the processing units 77 described with reference to FIGS. 6 and 7.

Figure 9:
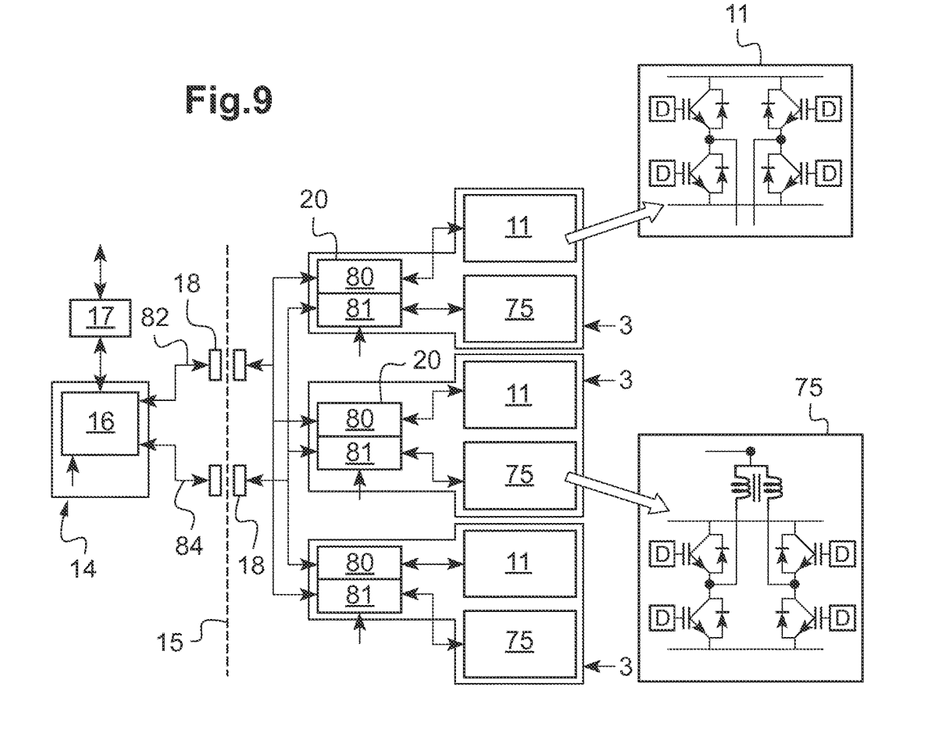
FIG. 9 is a functional representation of the architecture according to the second sub-mode of the second example implementation of the invention, and FIG. 10 schematically represents an example of a dual electrical supply of a control block.

FIG. 9 is a representation similar to that of FIG. 2 for the architecture of FIG. 8. As can be seen, each processing unit 20 is functionally split into two parts, the first part 80 being assigned to driving the switching cells 12 of an H-bridge 11 of the DC/AC voltage converter 2, this part 80 carrying out the tasks of the processing unit 20 described with reference to FIGS. 1 to 5, while a second part 81 is assigned to driving the switching cells 71 of a pair 75 of branches of the DC/DC voltage converter 70, this part 81 carrying out the tasks of the processing unit 77 described with reference to FIGS. 6 and 7.

The link 19 in this example provides for conveying between the remote control unit 14 and the control blocks 13 both data connected with the driving of the switching cells 71 of the DC/DC voltage converter 70, and data connected with the driving of the switching cells 12 of the DC/AC voltage converter 2. A wire 82 of the link 19 is for example dedicated to the exchange of data between the remote control unit 14 and the first parts 80 while another wire 84 is dedicated to the exchange of data between the remote control unit 14 and the second parts 81.

Two separate isolators 18 providing the potential barrier 15 between the remote control unit and the converters 2 and 70 can each have one of the wires 82 or 84 pass through it.

As a variant, a single multichannel isolator 18, having the wires 82 and 84 pass through it, can be used.

When the processing of the data from the converters 2 and 70 by the remote control unit 14 uses a microcontroller and when each control block 13 comprises an FPGA, the architecture 1 according to FIGS. 8 and 9 exhibits the safety-related advantages mentioned previously, while using only four digital processing components.

The invention is not limited to the examples which have just been described.

The expression "comprising a" must be understood to mean "comprising at least one", except when otherwise specified.

The invention claimed is:

1. An electrical architecture comprising:
    a DC/AC voltage converter for converting a DC voltage into an AC voltage and for converting an AC voltage into a DC voltage, comprising a plurality of arms assembled in parallel, each arm comprising two controllable switching cells, in series and separated by a midpoint, the arms being paired according to H-bridges;
    for each H-bridge, a dedicated control block, such that all the switching cells of said H-bridge can be controlled by the dedicated control block, each dedicated control block being configured to communicate with a same remote control unit through a potential barrier; and
    a DC/DC voltage converter comprising a high-voltage interface and a low-voltage interface, one of the high-voltage interface and the low-voltage interface being connected to the DC/AC voltage converter.

2. The architecture as claimed in claim 1, each control block comprising a first source of electrical energy and a second source of electrical energy, separate from the first source of electrical energy.

3. The architecture as claimed in claim 1, each control block including at least one selected from the group consisting of:
    a digital processing unit configured to communicate with the remote control unit,
    a device for measuring at least one electrical quantity in the H-bridge, and
    a device for measuring the temperature in the H-bridge.

4. The architecture as claimed in claim 3, each control block comprising a digital processing unit configured to communicate with a digital processing unit of the remote control unit via a link common to the control blocks and passing through said potential barrier, one of the digital processing units of a control block being master for this communication.

5. The architecture as claimed in claim 1, each control block being configured to communicate with the other control blocks.

6. The architecture as claimed in claim 1, the DC/DC voltage converter comprising several interleaved branches, each branch comprising:
    an arm extending between two terminals defining the low-voltage interface and comprising two controllable switching cells, in series and separated by a midpoint,
    a coil having one end connected to the midpoint of the branch and the other end connected to the positive terminal of the high-voltage interface.

7. The architecture as claimed in claim 6, the DC/DC voltage converter comprising an even number of branches, and the branches being paired, the coil of a branch of a pair being in magnetic coupling with the coil of the other branch of said pair.

8. The architecture as claimed in claim 7, comprising for each pair of branches a control block suitable for driving all the switching cells of said pair of branches.

9. The architecture as claimed in claim 8, each control block of a pair of branches of the DC/DC voltage converter comprising a first source of electrical energy and a second source of electrical energy that is separate from the first source of electrical energy.

10. The architecture as claimed in claim 9, each control block of a pair of branches of the DC/DC voltage converter comprising at least one from among:
    a digital processing unit configured to communicate with the remote control unit,
    a device for measuring at least one electrical quantity in the pair of branches, and
    a device for measuring the temperature in the pair of branches.

11. The architecture as claimed in claim 10, each control block of a pair of branches comprising a digital processing unit configured to communicate with the digital processing unit of the remote control unit via a link common to the control blocks of the switching cells of the H-bridges of the DC/AC voltage converter and common to the control blocks of the switching cells of a pair of branches of the DC/DC voltage converter, said link passing through said potential barrier, one of the digital processing units of a control block being master for this communication.

12. The architecture as claimed in claim 10, the number of branches of the DC/DC voltage converter being equal to the number of arms of the DC/AC voltage converter and the architecture comprising as many control blocks driving the switching cells of the DC/AC voltage converter as control blocks driving the switching cells of the DC/DC voltage converter.

13. The architecture as claimed in claim 12, the DC/AC voltage converter comprising six arms and the DC/DC voltage converter comprising six branches.

14. The architecture as claimed in claim 7, the number of branches of the DC/DC voltage converter being equal to the number of arms of the DC/AC voltage converter, and each control block dedicated to an H-bridge being also suitable for driving all the switching cells of a pair of arms of the DC/DC voltage converter.

15. The architecture as claimed in claim 1, additionally comprising:
    an electrical energy storage unit having a DC voltage across its terminals, and connected directly or not to the DC/AC voltage converter;
    an electrical stator winding, each electrical phase of the stator of being connected between two midpoints of an H-bridge; and
    the remote control unit.

16. The architecture as claimed in claim 15, comprising only a single microcontroller forming part of the remote control unit, and three or six programmable logic circuits (FPGAs) forming the digital processing units of the control blocks of the H-bridges.

17. A control method for the architecture as claimed in claim 15, comprising:
    detecting that at least one fault occurs in the architecture while a first control mode is applied to the switching cells; and
    generating a second control mode when the at least one fault is detected, this second control mode being then applied to all or some of the switching cells.

18. The method as claimed in claim 17, in which the first control mode allows and corresponds to the power supply from the electrical energy storage unit for the electrical stator winding, the latter being polyphase, and the second control mode applied provides for and corresponds to the placing in short circuit of all or some of the electrical phases of said winding.

19. The method as claimed in claim 17, in which the first control mode allows and corresponds to the power supply from the electrical energy storage unit for the electrical stator winding, the latter being polyphase, in which it is detected that the fault relates only to the control of one phase of the electrical stator winding, and in which the second control mode applied provides for and corresponds to the placing in short circuit of the other electrical phases of the electrical stator winding, or provides for temporarily suppressing, corresponding to the temporary suspension of the electrical phase in the control of which the fault occurs.

20. The method as claimed in claim 17, in which the first control mode allows and corresponds to the charging of the electrical energy storage unit from an electrical network through, among other items, the electrical stator winding, and in which the second control mode applied provides for interrupting, and corresponds to the interruption of, said charging or provides for reducing the performance level thereof, or notably corresponds to the reduction of its performance level.

21. The architecture as claimed in claim 1, further comprising:
- an electrical energy storage unit configured to receive a DC voltage, wherein the DC voltage is obtained by converting an AC voltage supplied by an electrical network, to charge the storage unit; and
- a stator of an electrical machine configured to receive an AC voltage, wherein the AC voltage is obtained by converting the DC voltage supplied by the electrical energy storage unit.

\* \* \* \* \*